US012501417B2

(12) United States Patent
Guchhait et al.

(10) Patent No.: US 12,501,417 B2
(45) Date of Patent: Dec. 16, 2025

(54) SYSTEMS AND METHODS FOR ENABLING SYNCHRONIZATION SIGNAL BLOCK (SSB) OPTIMIZATION FOR O-RAN-BASED RADIO ACCESS NETWORKS

(71) Applicant: Mavenir US Inc., Richardson, TX (US)

(72) Inventors: Atanu Guchhait, Bangalore (IN); Wessam Afifi Ahmed, Plano, TX (US); Young-Han Nam, Plano, TX (US)

(73) Assignee: Mavenir US Inc., Richardson, TX (US)

( * ) Notice: Subject to any disclaimer, the term of this patent is extended or adjusted under 35 U.S.C. 154(b) by 360 days.

(21) Appl. No.: 17/988,106

(22) Filed: Nov. 16, 2022

(65) Prior Publication Data

US 2023/0164759 A1    May 25, 2023

(30) Foreign Application Priority Data

Nov. 23, 2021  (IN) .............................. 202121054017

(51) Int. Cl.
*H04W 72/04* (2023.01)
*H04W 72/044* (2023.01)

(52) U.S. Cl.
CPC ................................. *H04W 72/046* (2013.01)

(58) Field of Classification Search
None
See application file for complete search history.

(56) References Cited

U.S. PATENT DOCUMENTS

| | | | | |
|---|---|---|---|---|
| 11,172,378 | B1* | 11/2021 | Marupaduga | H04B 17/336 |
| 2021/0352697 | A1* | 11/2021 | Irukulapati | H04B 7/0695 |
| 2023/0111244 | A1* | 4/2023 | He | H04W 52/0258 370/252 |
| 2024/0162955 | A1* | 5/2024 | Whinnett | H04W 24/10 |
| 2024/0205101 | A1* | 6/2024 | Soldati | H04L 41/16 |
| 2024/0414666 | A1* | 12/2024 | Elshafie | H04B 7/06968 |

OTHER PUBLICATIONS

Non-RT RIC: Functional Architecture (Year: 2021).*
(Continued)

*Primary Examiner* — Hashim S Bhatti
*Assistant Examiner* — Ahmed Saifuddin
(74) *Attorney, Agent, or Firm* — Ruggiero McAllister & McMahon LLC

(57) ABSTRACT

A method of optimizing synchronization signal block (SSB) beam configuration for 3rd Generation Partnership Project (3GPP) New Radio (NR) network includes: using at least one of an artificial intelligence (AI) and machine learning (ML) engine in one of service management and orchestration (SMO) module, non-real time radio access network intelligent controller (Non-RT RIC), and near-real time radio access network intelligent controller (Near-RT RIC), to derive at least one optimal SSB beam configuration for the 3GPP NR network; and communicating, by the at least one of the AI and ML engine, the derived at least one optimal SSB beam configuration to a network node of the 3GPP NR network. Both the training and deployment of the at least one of the AI and ML engine are executed in the Non-RT RIC, and a static mapping between SSB beam identifiers (IDs) and beamforming weights (BFWs) is predefined.

2 Claims, 7 Drawing Sheets

(56) References Cited

OTHER PUBLICATIONS

Extended European Search Report for corresponding European patent application EP22208779.3, 8 pages, dated Mar. 23, 2023.
O-RAN Alliance Working Group 2 Non-RT-RIC-ARCH-TR v. 01.01 "ORAN Working Group 2, Non-RT RIC: Functional Architecture"; O-RAN Technical Report, O-RAN Alliance, Jun. 3, 2021.
O-RAN Alliance Working Group 2 AIML. v. 01.00 "ORAN Working Group 2, AI/ML workflow description and requirements" 2; O-RAN Technical Report, O-RAN Alliance, Dec. 1, 2009.
Solmaz Niknam et al."Intelligent O-RAN for Beyond 5G and 6G Wireless Networks"Arxiv.Org, Cornell University Library, 201 Olin Library Cornell University Ithaca, NY 14853, May 17, 2020.

* cited by examiner

Fig 3: SMO – Near-Real Time RIC based AI/ML Framework for SS Beam Settings

SYSTEMS AND METHODS FOR ENABLING SYNCHRONIZATION SIGNAL BLOCK (SSB) OPTIMIZATION FOR O-RAN-BASED RADIO ACCESS NETWORKS

BACKGROUND OF THE DISCLOSURE

1. Field of the Disclosure

The present disclosure relates to Radio Access Network (RAN) for 4G- and 5G-based mobile networks, and relates more particularly to synchronization signal block (SSB) optimization for Open Radio Access Network (O-RAN)-based networks.

2. Description of the Related Art

Conventional radio access networks (RAN) were built employing an integrated unit where the entire RAN was processed. The RAN network traditionally uses application specific hardware for processing, making them difficult to upgrade and evolve. As future networks evolve to have massive densification of networks to support increased capacity requirements, there is a growing need to reduce the capital and operating costs of RAN deployment and make the solution scalable and easy to upgrade.

Cloud based Radio Access Networks (CRAN) are networks in which a significant portion of the RAN layer processing is performed at a central unit (CU) and a distributed unit (DU), both of which can be part of the baseband unit (BBU), depending on the functional split. CUs are usually located in the cloud on commercial off-the-shelf servers, while the RF and real-time critical functions can be processed in the remote radio unit (RU or RRU).

In $3^{rd}$ Generation Partnership Project (3GPP) New Radio (NR) technology, e.g., 5G NR (which includes an air interface standard, i.e., the radio frequency portion between the mobile device and the base station), a base station will broadcast synchronization signal blocks (SSB), e.g., in beams. In conventional large scale NR network deployments, e.g., with thousands of gNB and/or transmission-and-reception points (TRPS), SSB beam (or common beam) configurations for the network are derived manually based on statistical data during the deployment time. The SSB beam configurations are network-usage dependent, which varies slowly over time. Manually derived per-gNB and/or per-TRP SSB beam configurations are over-estimated to accommodate worst case scenarios which may arise only for a small window of time. Therefore, using manually derived SSB beam configurations is not optimal and impacts at least the following aspects of the network operation: i) increased power consumptions in both the network and the UEs, leading to increased network capital expenditure and reduced UE battery life; and ii) degraded utilization of time-frequency resources affecting spectral efficiency (SE).

One conventional technique for addressing the above-noted impacts is to use inferior SSB beam configuration at the installation time. However, using inferior static SSB beam setting will increase initial access (IA) latency and result in non-satisfactory reactive tracking performance indicator (e.g., key performance indicator (KPI)) reports due to the applied non-optimal configuration setting of large number of parameters available for synchronization signal (SS) bursts and Channel State Information Reference Signal (CSI-RS) (which is also generically referenced as a tracking reference signal (TRS)) configuration supported in 3GPP NR. In addition, UE may also observe degraded tracking performances and related KPI degradations.

In the case of 3GPP NR-based massive multiple-input-multiple-output (mMIMO) systems with large number of transmit and receive antennas, network-usage-dependent, slow-time-varying SSB beam configuration setting (e.g., beam weight generation and/or indicating right beam configurations) and the ability to effectively communicate the setting to respective nodes in the network are important for optimized operation. In addition, SSB beam configuration and allocation are complex processes for 3GPP NR-based systems with large carrier bandwidth and for systems with carrier aggregation support where multiple bandwidth parts (BWPs) are active with multiple time-frequency resource allocations for initial access (IA) and tracking-acquisition (TA) reference signal transmissions.

In addition to the above-mentioned time dependent network usage patterns, demography of the deployment also influences the design of optimal configuration sets.

Therefore, there is a need for a system and a method for optimizing and applying time-dependent SSB beam configuration which will lead to improved spectral and power efficient network.

SUMMARY OF THE DISCLOSURE

According to an example embodiment of the present disclosure, a method of optimizing SSB beam configuration utilizes an artificial intelligence (AI) and/or machine learning (ML) optimizer running in one of the core network elements (e.g., service management and orchestration (SMO), Non-Real Time RAN Intelligent Controller (Non-RT RIC) and/or Near-Real Time RIC) infers (derives) optimal SS Beam configurations per gNB/TRP based on multiple time, location, and usage-dependent observations which are already available at different nodes of the 3GPP NR and/or O-RAN access and core network elements (e.g., O-DUs, O-CUs, O-RU, and SMO).

According to an example embodiment of the present disclosure, the inferred optimal SSB beam configurations are communicated efficiently to respective nodes dynamically in the RAN system supported by both 3GPP and O-RAN system.

For an example scenario ("scenario 1"), both the training and deployment of the AI/ML algorithms are executed in the non-real time RIC, then new configurations are conveyed to the O-DU and O-RU via the O1 and M-plane interfaces, respectively.

According to an example embodiment of the present disclosure, a first example method for scenario 1 involves static mapping between SSB beam IDs and beamforming weights (BFWs), i.e., using an index. In this example method, a static mapping between the SSB beam IDs and beamforming weights is predefined in the SMO and O-RU, and the mapping is sent internally from the SMO to the artificial intelligence/machine learning (AI/ML) engine via the O1 interface for offline training. New configurations are then sent back to O-DU and O-RU after running the AI/ML algorithms.

According to an example embodiment of the present disclosure, a second example method for scenario 1 involves using a static beam book-based method. In this example method, several beam books are predefined in the SMO and O-RU, and the beam books are sent internally from the SMO to the artificial intelligence/machine learning (AI/ML) engine via the R1 interface. After optimization, new beam book IDs are sent to the O-DU and O-RU for future use.

According to an example embodiment of the present disclosure, a third example method for scenario 1 involves using a dynamic beam book (e.g., using in-phase/quadrature (IQ) signalling). In this example method, based on the beamforming weight optimization, the AI/ML engine generates sets of beamforming weights vectors and assigns beam ID for each beamforming vector, which beam IDs are sent to O-DU.

For an example scenario ("scenario 2") in which training is executed in non-real time RIC and deployment is executed in near real-time RIC, the AI/ML optimization is executed in the near real-time RIC to accommodate for time-sensitive use cases which require near real-time optimization and configurations.

DETAILED DESCRIPTION

Figure 1:
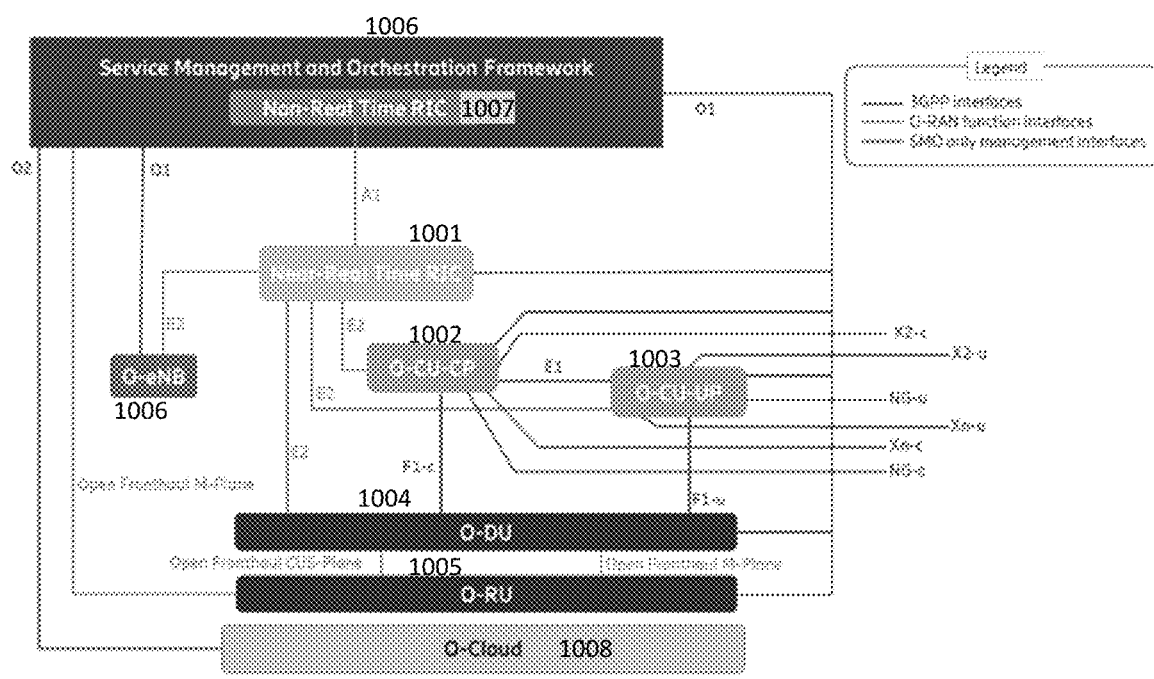
FIG. 1 is a diagram illustrating the architecture of O-RAN.

Definitions and/or explanations of various terms and component features are provided below:

E2 Node: A logical node terminating E2 interface. O-RAN nodes terminating E2 interface are:
  for NR access: O-CU-CP, O-CU-UP, O-DU or any combination
  for E-UTRA access: O-eNB.

Near-RT RIC: O-RAN Near-Real-Time RAN Intelligent Controller: A logical function that enables near-real-time control and optimization of RAN elements and resources via fine-grained data collection and actions over E2 interface. It may include AI/ML workflow including model training, inference and updates.

Non-RT RIC: O-RAN Non-Real-Time RAN Intelligent Controller: A logical function within SMO that drives the content carried across the A1 interface. It is comprised of the Non-RT RIC Framework and the Non-RT RIC Applications (rApps) whose functions are defined below.

Non-RT RIC Applications (rApps): Modular applications that leverage the functionality exposed via the non-RT RIC Framework's R1 interface to provide added value services relative to RAN operation, such as driving the AI interface, recommending values and actions that may be subsequently applied over the O1/O2 interface and generating "enrichment information" for the use of other rApps. The rApp functionality within the non-RT RIC enables non-real-time control and optimization of RAN elements and resources and policy-based guidance to the applications/features in Near-RT RIC.

Non-RT RIC Framework: That functionality internal to the SMO that logically terminates the AI interface to the Near-RT RIC and exposes to rApps, via its R1 interface, the set of internal SMO services needed for their runtime processing. The Non-RT RIC Framework functionality within the non-RT RIC provides AI/ML workflow including model training, inference and updates needed for rApps.

NMS: A Network Management System for the O-RU to support legacy Open Fronthaul M-Plane deployments.

O-Cloud: O-Cloud is a cloud computing platform comprising a collection of physical infrastructure nodes that meet O-RAN requirements to host the relevant O-RAN functions (such as Near-RT RIC, O-CU-CP, O-CU-UP, and O-DU), the supporting software components (such as Operating System, Virtual Machine Monitor, Container Runtime, etc.) and the appropriate management and orchestration functions.

O-CU-CP: O-RAN Central Unit-Control Plane: a logical node hosting the RRC and the control plane part of the PDCP protocol.

O-CU-UP: O-RAN Central Unit-User Plane: a logical node hosting the user plane part of the PDCP protocol and the SDAP protocol.

O-DU: O-RAN Distributed Unit: a logical node hosting RLC/MAC/High-PHY layers based on a lower layer functional split.

O-eNB: An eNB or ng-eNB that supports E2 interface.

O-RU: O-RAN Radio Unit: a logical node hosting Low-PHY layer and RF processing based on a lower layer functional split. This is similar to 3GPP's "TRP" or "RRH" but more specific in including the Low-PHY layer (FFT/iFFT, PRACH extraction).

O1: Interface between SMO framework and O-RAN managed elements, for operation and management, by which FCAPS management, PNF (Physical Network Function) software management, File management shall be achieved.

O2: Interface between SMO framework and the O-Cloud for supporting O-RAN virtual network functions.

SMO: A Service Management and Orchestration system xApp: An application designed to run on the near-RT RIC. Such an application is likely to consist of one or more microservices and at the point of on-boarding will identify which data it consumes and which data it provides. The application is independent of the near-RT RIC and may be provided by any third party. The E2 enables a direct association between the xApp and the RAN functionality.

FIG. 1 is a diagram illustrating the architecture of O-RAN. The radio side includes Near-RT RIC 1001, O-CU-CP 1002, O-CU-UP 1003, O-DU 1004, and O-RU 10005 modules (also referred to as functions). The E2 interface connects O-eNB 1006 to Near-RT RIC 1001. Although not explicitly shown in FIG. 1, the O-eNB 1006 does support O-DU 1004 and O-RU 1005 functions with an Open Fronthaul interface between them.

The management side includes SMO Framework 1006 containing a Non-RT-RIC 1007 function. The O-Cloud 1008, on the other hand, is a cloud computing platform comprising a collection of physical infrastructure nodes that meet O-RAN requirements to host the relevant O-RAN functions (e.g., Near-RT RIC, O-CU-CP, O-CU-UP and O-DU, etc.), the supporting software components (e.g., Operating System, Virtual Machine Monitor, Container Runtime, etc.) and the appropriate management and orchestration functions. The O-RU 1005 terminates the Open Fronthaul M-Plane interface towards the O-DU 1004 and SMO Framework 1006.

In one example embodiment of the present disclosure, the O-RU conveys the O-RU characteristics (e.g., the number of vertical antennas, number of horizontal antennas, physical antenna spacing, etc.) to the AI/ML engine via the M-plane interface. In another example embodiment of the present disclosure, the SMO conveys the O-RU characteristics (e.g., the number of vertical antennas, number of horizontal antennas, physical antenna spacing, etc.) to the AI/ML engine internally after receiving these parameters from the O-RU. In yet another example embodiment of the present disclosure, the SMO conveys to the AI/ML engine all the required parameters needed at the AI/ML engine to do SSB optimization such as the number of sectors, number of cells, the physical cell identity of each cell, and all other relevant parameters related to O-DU configs.

In all of the example methods described below (e.g., example methods described in connection with FIGS. 4-7), all signaling between the O-RU and other system nodes are representatives for a single O-RU implementation. However, in actual implementation, multiple O-RUs could be connected to the O-DU and SMO. Hence, all signaling below shall be defined per O-RU, and different nodes shall include an O-RU ID to differentiate among different O-RUs connected to the O-DU and SMO. Furthermore, measurements reported from the O-RU to the SMO are UE-based, and these measurements shall be marked by a UE ID to differentiate them at the SMO and provide the AI/ML engine with the needed parameters for optimization.

Example Scenario 1: Training and Deployment Occurring in Non-Real Time RIC

Figure 2:
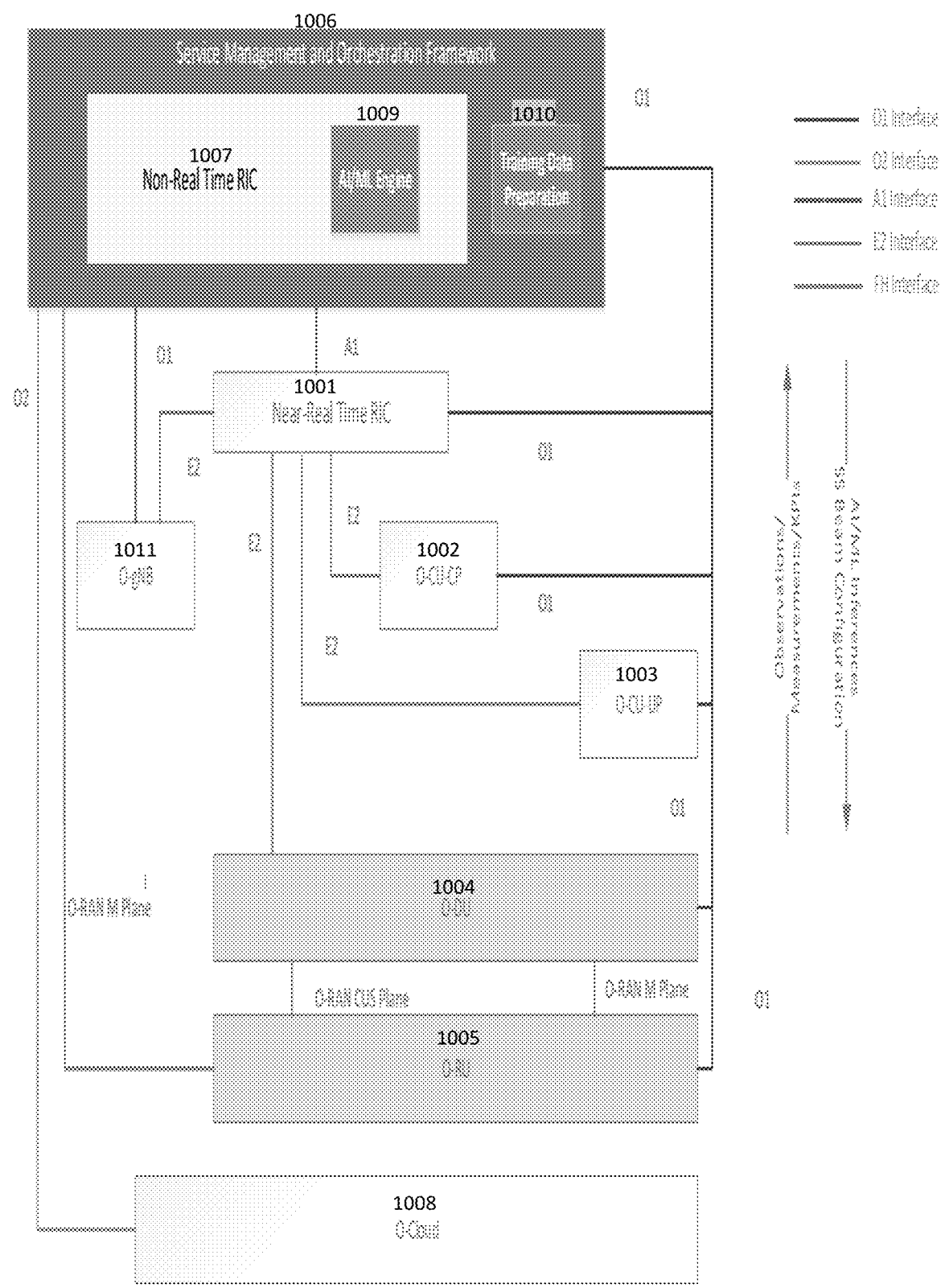
FIG. 2 is a diagram illustrating an example embodiment of a system architecture in which both data training and AI/ML optimization are executed in the non-real time RIC.

FIG. 2 illustrates an example embodiment of a system architecture in which both data training and AI/ML optimization are executed in the non-real time RIC. The system components shown in FIG. 2 largely correspond to those shown in FIG. 1, with the following additions and/or changes shown: AI/ML engine 1009 (within Non-RT RIC 1007); training data preparation module 1010 (within SMO framework 1006; prepared data will be used by the Non-RT RIC 1007 for training); and O-gNB 1011. As shown in FIG. 2, some of the interfaces involved in the processes include: the O1 interface, where training data collection from E2 nodes and O-RU to non-real time RIC occurs; the R1 interface for model data deployment as an rAPP (configured to manage non-real time events, for example) in the Non-Real Time RIC; M-plane interface for training data collection and inference communication from or to the O-RU, e.g., indication of success or failure in inference application. In the following sections, three example methods in the Example Scenario 1 (training and deployment implemented in the non-real time RIC).

First Example Method of Scenario 1

According to an example embodiment of the present disclosure, a first example method for scenario 1 involves static mapping between SSB beam IDs and beamforming weights (BFWs), i.e., using an index. In this example method, a static mapping between the SSB beam IDs and beamforming weights is predefined in the SMO and O-RU, and the mapping is sent internally from the SMO to the artificial intelligence/machine learning (AI/ML) engine via the O1 interface for offline training. New configurations are then sent back to O-DU and O-RU after running the AI/ML algorithms. Alternatively, the set of SSB beam IDs and corresponding beamforming weights are sent directly from the O-RU to the AI/ML engine via the O1 interface. Note that these beam IDs and corresponding beamforming weights can be also conveyed via the M-plane on start-up to the O-DU during training phase. In another alternative embodiment, the AI/ML engine feeds the set of SSB beam IDs and corresponding beamforming weights to the AI/ML algorithms for optimization of the SSB configurations and outputs a second set of SSB beam IDs and beamforming weights, wherein the second set is smaller than or equal to the original set fed into the AI/ML engine. In yet another example embodiment, the O-RU sends the azimuth beamwidth, elevation beamwidth, azimuth steering angle, and elevation steering angle to the AI/ML engine for beam-ID-based optimization.

Figure 3:
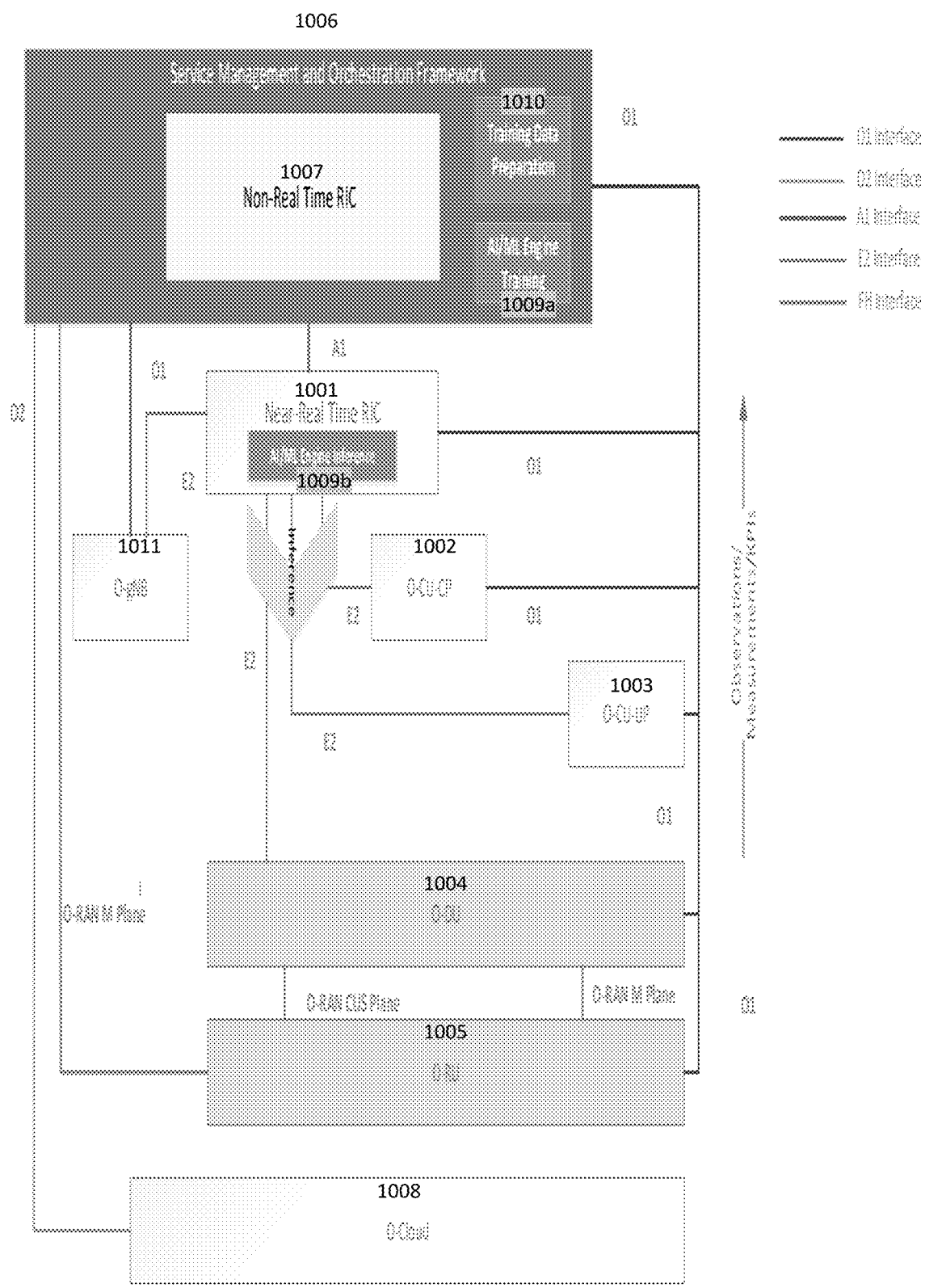
FIG. 3 is a diagram illustrating an example embodiment of a system architecture in which training is executed in non-real time RIC and AI/ML optimization is executed in near real-time RIC.
Figure 4:
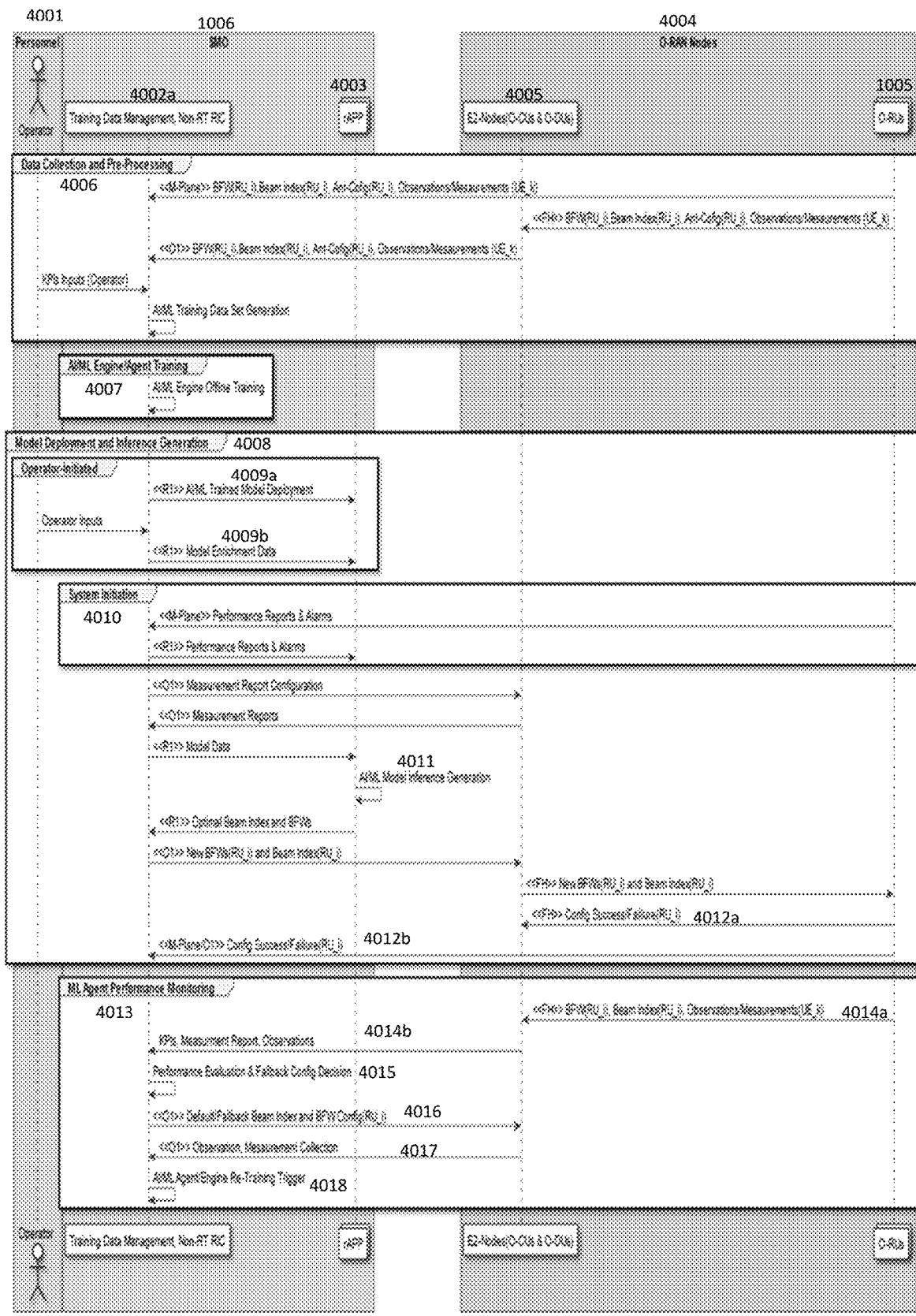
FIG. 4 illustrates a call flow diagram for an example method using static mapping between beam IDs and BFWs.

FIG. 4 illustrates a call flow diagram for an example method using static mapping between beam IDs and BFWs, i.e., using an index. As shown in FIG. 4, the operator 4001 provides key performance indicators (KPIs) inputs and other operator inputs. The network components shown in FIG. 4 include: i) SMO framework 1006, within which training data management functionality block involving Non-RT RIC 4002 and rAPP 4003 are provided; and ii) O-RAN nodes 4004, which includes E2 nodes (e.g., O-CUs and O-DUs) and O-RUs 1005. In one example embodiment shown in FIG. 4, the training data management functionality block 4002 within the Non-RT RIC (e.g., 1007 shown in FIGS. 1-3) obtains (as shown within the "data collection and pre-processing" call-flow block 4006) BFW, beam indices, antenna configurations, and observations/measurements from the O-RUs 1005 over the M-Plane. In an alternative embodiment, BFW, beam indices, antenna configurations, and observations/measurements from the O-RUs 1005 are sent over the fronthaul (FH) to the E2 nodes (e.g., O-CUs and O-DUs), and these parameters are relayed by the E2 nodes to the training data management functionality block 4002 within the Non-RT RIC (e.g., 1007 shown in FIGS. 1-3). Also shown within the "data collection and pre-processing" call-flow block 4006 are the KPIs inputs from the operator 4001 and AI/ML training data set generation by the training data management functionality block 4002 within the Non-RT RIC.

According to one example embodiment, training data collection and control unit within the SMO framework 1006 can collect one or more of the following measurements and observations from E2 nodes (e.g., O-DU, O-CU-UP, O-CU-CP, and/or gNB) which are pre-processed to generate AI/ML model training data, which training data are used along with BFW and indices to train the AI/ML model offline:

SS Beam IDs and corresponding beam weight vectors from O-RU;
SSB based reference signal received power (RSRP) reports, Physical Random Access Channel (PRACH) power, beam index;
Successful and/or failed Random Access Channel (RACH) attempts and Rx beam index;
Number of connected UEs to each gNB/TRPs in an observations;
Supported Massive MIMO system configurations;
Operators' inputs and KPIs:
Initial access latency target;
PRACH, Physical Uplink Shared Channel (PUSCH) and Sounding Reference Signal (SRS) based timing advance (TA) estimation accuracy targets;
Target uplink (UL)/downlink (DL) throughput and spectral efficiency; and
Network coverage and/or accessibility metrics.

In an example embodiment, training of the AI/ML engine can be performed offline, e.g., as shown in the functionality block 4007 in FIG. 4. Upon receiving the indication of successful training completion, SMO informs model deployment readiness to the Non-Real Time RIC functionality. As shown in the "model deployment and inference generation model" functionality block 4008, Non-Real Time RIC deploys (as shown by the process arrow 4009a) the trained AI/ML model (e.g., which can be within the Non-Real Time RIC) as rAPP via R1 interface, as well as utilizing model enrichment data (as shown by the process arrow 4009b). Next, as shown in functionality block 4010, system initiation can involve O-RUs sending (over the M-Plane) performance reports and alarms to the training data management functionality block 4002 within the Non-RT RIC (e.g., 1007 shown in FIGS. 1-3), which performance reports and alarms are subsequently made available to the rAPP (i.e., the deployed AI/ML model).

After system initiation 4010, the deployed model uses the performance reports, measurement reports, model data and/or enrichment data available in the SMO via R1 interface to generate inferences (e.g., as shown by "AI/ML Model Inference Generation" process arrow 4011), which inferences can consist of optimal beam IDs index and corresponding beam forming weights (BFWs). In an example embodiment, the AI/ML engine sends the new optimized set of SSB beam IDs index and BFWs to the O-DU and O-RU (e.g., via the O1 interface and the fronthaul (FH), or alternatively through M-plane interface) and updates the static beam ID mapping internally within the SMO.

In an example embodiment, the AI/ML engine can attach a start time parameter along with the new optimal set of SSB beam IDs and beamforming weights (BFWs) and send them to the O-DU and O-RU via the O1 and/or the M-plane interface(s), which start time parameter specifies the time where the O-DU and O-RU are allowed to replace and use the new set of SSB beam IDs and beamforming weights (BFWs). The start time can be specified in different ways, e.g., as a frame number, subframe number slot index, and orthogonal frequency division multiplex (OFDM) symbol index. In an example embodiment, the start time can be expressed as absolute time. In another example embodiment, the start time can be expressed in terms of the SSB burst index.

In an example embodiment, depending on the available memory, the O-DU and O-RU only mark the SSB beam IDs and corresponding beamforming weights (BFWs) received from the AI/ML optimization as active, and the inactive (old) set of SSB beam IDs and corresponding beamforming weights (BFWs) can be retained. In an example embodiment, when the O-RUs are successful in applying the new optimal set of SSB beam IDs and beamforming weights, the O-RUs can send success status to the O-DU and the SMO, e.g., via the O1 and/or the M-Plane interface(s) (e.g., process arrow 4012a or 4012b).

As shown in the functionality block 4013 (labeled "ML Agent Performance Monitoring"), following the successful application of new optimal set of SSB beam IDs and beamforming weights (BFWs), O-RUs can continue to observe and measure a set of predefined parameters and send reports to SMO and O-DU (e.g., via Fronthaul (process arrow 4014a) and/or O1 interface (process arrow 4014b)) as performance feedbacks. In an example embodiment, these observations and measurements can be used for performance evaluation and the decision to utilize a fallback configuration for the AI/ML model depending on the performance evaluation (process arrow 4015). In an example embodiment, the decision to either retain the AI/ML model or utilize a fallback configuration is made by the SMO, e.g., the system performance after the application of the new BFWs and the associated SSB beam IDs index is reported by the O-DU and compared against the target KPIs set by the operator. If the decision is made to use the fallback configuration for the AI/ML model, the default fallback SSB beam IDs index and the BFWs are transmitted by the Non-RT RIC to the O-DU over the O1 interface (process arrow 4016), and observation and/or measurement collection by the Non-RT RIC occurs over the O1 interface (process arrow 4017), followed by triggering of AI/ML engine re-training (process arrow 4018).

Second Example Method of Scenario 1

According to an example embodiment of the present disclosure, a second example method for scenario 1 involves using a static beam book-based method. In this example method, several SSB beam books are predefined in the SMO and O-RU, and the beam books are sent internally from the SMO to the artificial intelligence/machine learning (AI/ML) engine via the R1 interface. A beam book consists of a set of SSB beam IDs and the corresponding beamforming weights (BFWs). A beam book may also be referred to as a beam book ID. After optimization, new beam book IDs are sent to the O-DU and O-RU for future use. Alternatively, in an example embodiment, the beam books are sent directly from the O-RU to the AI/ML engine via the O1 interface. These beam books can be also conveyed via the M-plane on start-up to the O-DU during training phase. In another alternative embodiment, the AI/ML engine feeds the set of beam books to the AI/ML algorithms for optimization of the SSB configurations and outputs a second set of SSB beam books (book IDs) with corresponding beamforming weights, wherein the second set is smaller than or equal to the original set fed into the AI/ML engine.

Figure 5:
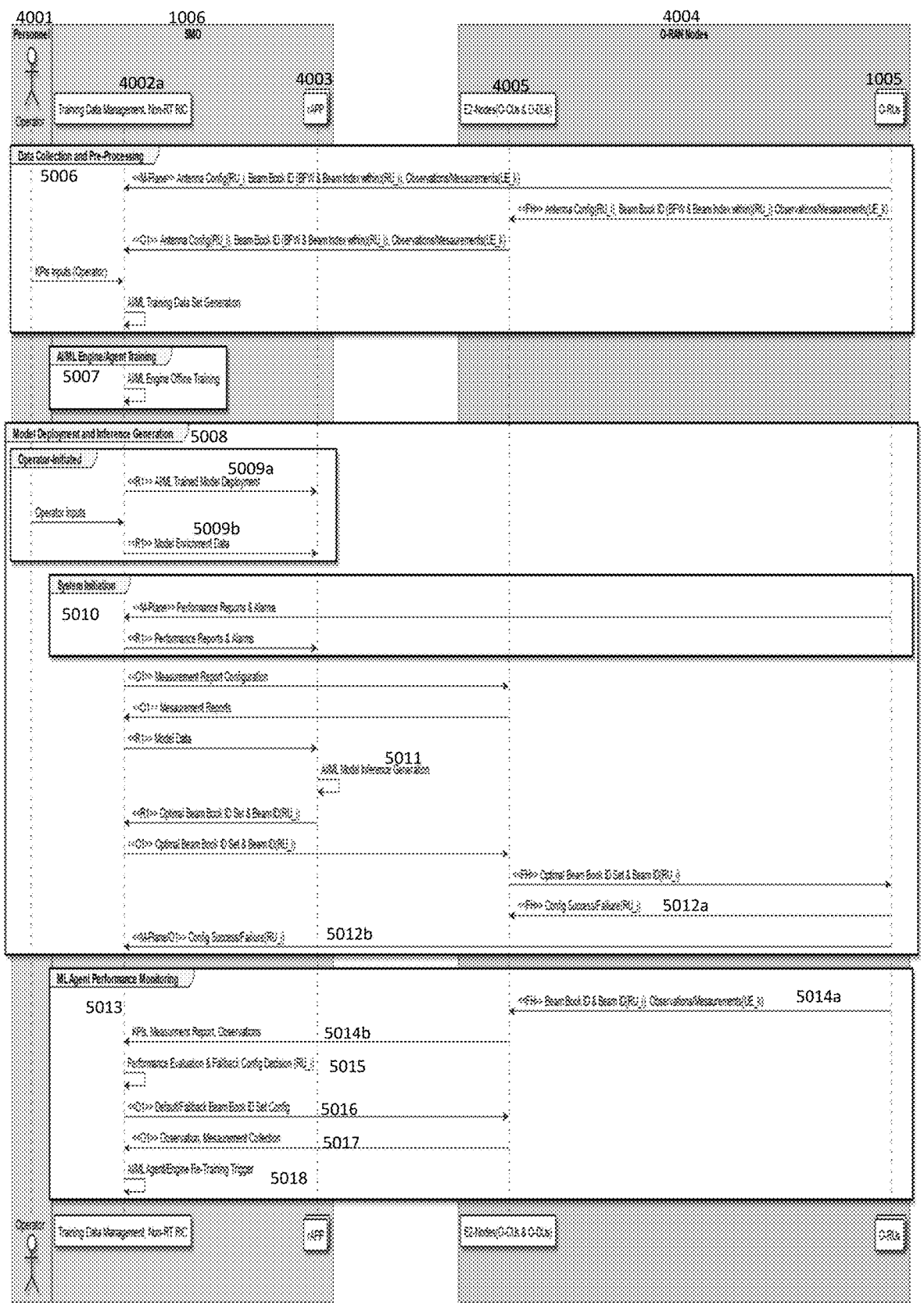
FIG. 5 illustrates a call flow diagram for a static beam book-based method.

FIG. 5 illustrates a call flow diagram for an example method using a static beam book. As shown in FIG. 5, the operator 4001 provides key performance indicators (KPIs) inputs and other operator inputs. The network components shown in FIG. 5 include: i) SMO framework 1006, within which training data management functionality block involving Non-RT RIC 4002 and rAPP 4003 are provided; and ii) O-RAN nodes 4004, which includes E2 nodes (e.g., O-CUs and O-DUs) and O-RUs 1005. In one example embodiment shown in FIG. 5, the training data management functionality block 4002 within the Non-RT RIC (e.g., 1007 shown in FIGS. 1-3) obtains (as shown within the "data collection and pre-processing" call-flow block 5006) beam book IDs, antenna configurations, and observations/measurements from the O-RUs 1005 over the M-Plane. In an alternative embodiment, beam book IDs, antenna configurations, and observations/measurements from the O-RUs 1005 are sent over the fronthaul (FH) to the E2 nodes (e.g., O-CUs and O-DUs), and these parameters are relayed by the E2 nodes to the training data management functionality block 4002 within the Non-RT RIC. Also shown within the "data collection and pre-processing" call-flow block 5006 are the KPIs inputs from the operator 4O01 and AI/ML training data set generation by the training data management functionality block 4002 within the Non-RT RIC.

According to one example embodiment, training data collection and control unit within the SMO framework 1006 can collect one or more of the following measurements and observations from E2 nodes (e.g., O-DU, O-CU-UP, O-CU-CP, and/or gNB) which are pre-processed to generate AI/ML model training data, which training data are used along with the beam book sets indexed by the beam book IDs to train the AI/ML model offline, inside the SMO framework 1006:

Default Beam Book (consists of a set of beam IDs and the corresponding beamforming weights) from O-RU;
SSB RSRP reports, PRACH power, Active SSB beam index;
Successful and failed RACH attempts and Rx beam index;
Number of connected UEs to each gNB/TRPs in an observation;
Supported Massive MIMO system configurations;
Operators' inputs and KPIs:
 Initial access latency target,
 PRACH, PUSCH and SRS-based TA estimation accuracy targets,
 Target UL/DL throughput and spectral efficiency, and
 Network coverage and accessibility metrics.

In an example embodiment, training of the AI/ML engine can be performed offline, e.g., as shown in the functionality block 5007 in FIG. 5. Upon receiving the indication of successful training completion, SMO informs model deployment readiness to the Non-Real Time RIC functionality. As shown in the "model deployment and inference generation model" functionality block 5008, Non-Real Time RIC deploys (as shown by the process arrow 5009a) the trained AI/ML model (e.g., which can be within the Non-Real Time RIC) as rAPP via R1 interface, as well as utilizing model enrichment data (as shown by the process arrow 5009b). Next, as shown in functionality block 5010, system initiation can involve O-RUs sending (over the M-Plane) performance reports and alarms to the training data management functionality block 4002 within the Non-RT RIC (e.g., 1007 shown in FIGS. 1-3), which performance reports and alarms are subsequently made available to the rAPP (i.e., the deployed AI/ML model).

After system initiation 5010, the deployed model uses the performance reports, measurement reports, model data and/or enrichment data available in the SMO via R1 interface to generate inferences (e.g., as shown by "AI/ML Model Inference Generation" process arrow 5011), which inferences can consist of an optimal set of SSB beam book IDs. In an example embodiment, the AI/ML engine sends the new optimized set of SSB beam book IDs to the O-DU and O-RU (e.g., via the O1 interface and the fronthaul (FH), or alternatively through M-plane interface) and updates the set of active SSB beam books internally within the SMO.

In an example embodiment, the AI/ML engine can attach a start time parameter along with the new optimal set of SSB beam book IDs and send them to the O-DU and O-RU via the O1 and/or the M-plane interface(s), which start time parameter specifies the time where the O-DU and O-RU are allowed to replace and use the new set of SSB beam book IDs. The start time can be specified in different ways, e.g., as a frame number, subframe number slot index, and OFDM symbol index. In an example embodiment, the start time can be expressed as absolute time. In another example embodiment, the start time can be expressed in terms of the SSB burst index.

In an example embodiment, depending on the available memory, the O-DU and O-RU only mark the SSB beam book IDs received from the AI/ML optimization as active, and the inactive (old) set of SSB beam book IDs can be retained. In an example embodiment, when the O-RUs are successful in applying the new optimal set of SSB beam book IDs, the O-RUs can send success status to the O-DU and the SMO, e.g., via the O1 and/or the M-Plane interface(s) (e.g., process arrow 5012a or 5012b).

As shown in the functionality block 5013 (labeled "ML Agent Performance Monitoring"), following the successful application of new optimal set of SSB beam book IDs, the O-RUs can continue to observe and measure a set of predefined parameters and send reports to SMO and O-DU (e.g., via Fronthaul (process arrow 5014a) and/or O1 interface (process arrow 5014b)) as performance feedbacks. In an example embodiment, these observations and measurements can be used for performance evaluation and the decision to utilize a fallback configuration for the AI/ML model depending on the performance evaluation (process arrow 5015). In an example embodiment, the decision to either retain the AI/ML model or utilize a fallback configuration is made by the SMO, e.g., the system performance after the application of the new SSB beam book IDs is reported by the O-DU and compared against the target KPIs set by the operator. If the decision is made to use the fallback configuration for the AI/ML model, the default fallback SSB beam book IDs (each beam book consisting of BFW and beam index) are transmitted by the Non-RT RIC to the O-DU over the O1 interface (process arrow 5016), and observation and/or measurement collection by the Non-RT RIC occurs over the O1 interface (process arrow 5017), followed by triggering of AI/ML engine re-training (process arrow 5018).

In an example embodiment, the inference generated by the AI/ML model is per eNB/gNB/TRP, and the inference is applied to the O-RU by the O-DU or the SMO depending on the nature of the operation. In an example embodiment, training data collected by the SMO is per eNB/gNB/TRP, and the AI/ML model training deployment can be per eNB/gNB/TRP or for a set of eNB/gNB/TRP. In an example embodiment for a hybrid case, the AI/ML-model-generated inference consists of a set of beam book IDs and, specific to each beam book ID, a subset of beam ID indices, which subset is in turn used to set the beam forming weights in the O-RUs. In another example embodiment, the AI/ML-model-generated inference is per eNB/gNB/TRP and applied to the O-RU by the O-DU or the SMO depending on the nature of the operation. In another example embodiment, the training data collected by the SMO is per eNB/gNB/TRP, and AI/ML model training deployment can be per eNB/gNB/TRP or for a set of eNB/gNB/TRP.

Third Example Method of Scenario 1

According to an example embodiment of the present disclosure, a third example method for scenario 1 involves using a dynamic beam book (e.g., using in-phase/quadrature (IQ) signalling). In this example method, based on the beamforming weight optimization, the AI/ML engine generates sets of beamforming weights vectors and assigns beam ID for each beamforming vector, which beam IDs are sent to O-DU. In an example embodiment, the AI/ML engine receives the parameters to optimize the beamforming weights from the SMO and/or the O-DU via the O1 interface, and/or from the O-RU via the M-plane interface, which parameters for optimization can include the number of vertical and horizontal antennas, antenna spacing, number of sectors, number of cells, physical cell identifiers, etc. In an example embodiment, based on the beamforming weight optimization, the AI/ML engine generates sets of beamforming weights vectors and assigns beam ID for each beamforming weight vector. In an example embodiment, the AI/ML engine sends the set of multiple beamforming weight vectors and associated beam IDs to the O-DU via the O1 interface.

Figure 6:
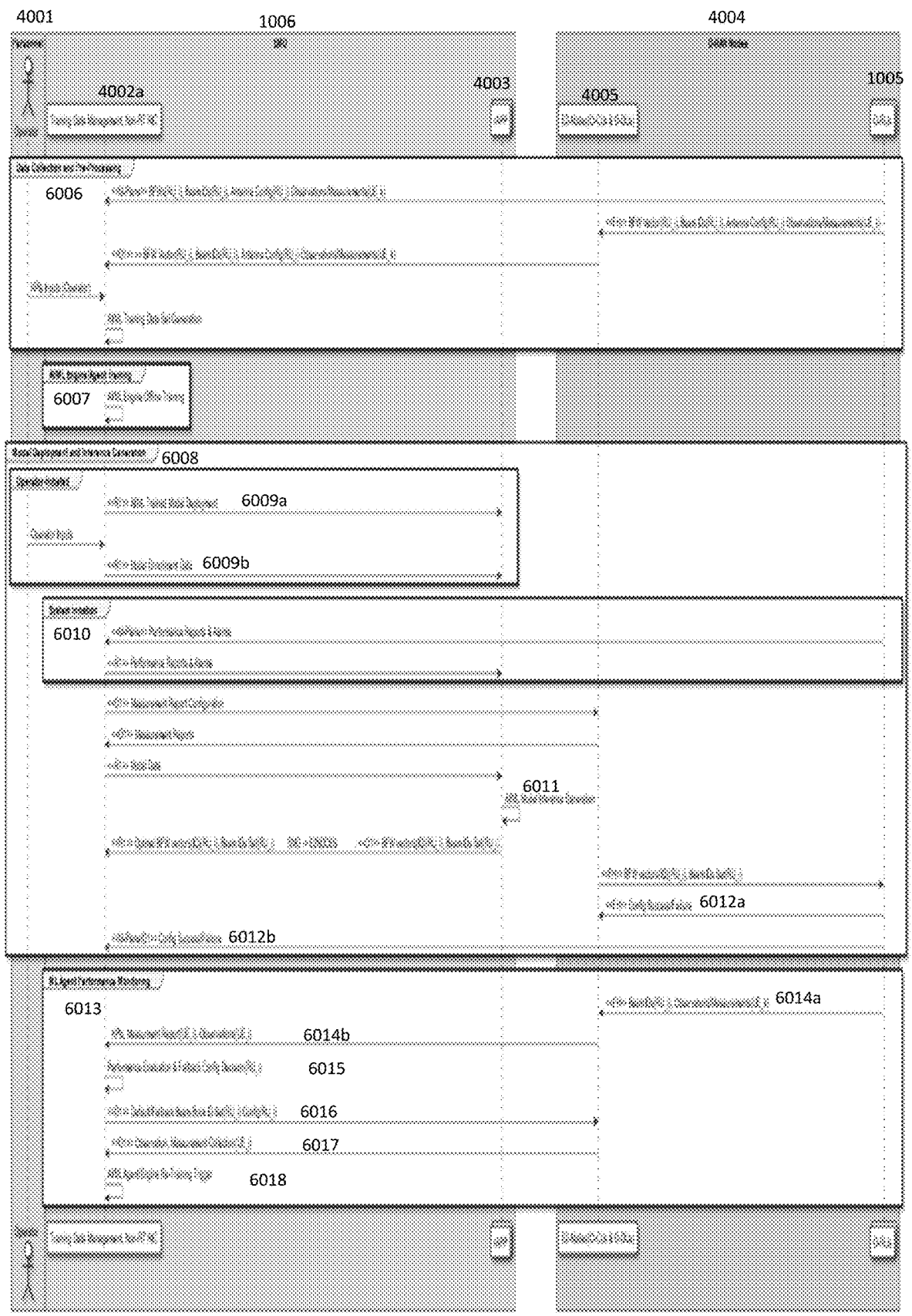
FIG. 6 illustrates a call flow diagram for an example method using a dynamic beam book.

FIG. 6 illustrates a call flow diagram for an example method using a dynamic beam book. As shown in FIG. 6, the operator 4001 provides key performance indicators (KPIs) inputs and other operator inputs. The network components shown in FIG. 6 include: i) SMO framework 1006, within which training data management functionality block involving Non-RT RIC 4002 and rAPP 4003 are provided; and ii) O-RAN nodes 4004, which includes E2 nodes (e.g., O-CUs and O-DUs) and O-RUs 1005. In one example embodiment shown in FIG. 6, the training data management functionality block 4002 within the Non-RT RIC (e.g., 1007 shown in FIGS. 1-3) obtains (as shown within the "data collection and pre-processing" call-flow block 4006) BFWs, beam IDs, antenna configurations, and observations/measurements from the O-RUs 1005 over the M-Plane. In an alternative embodiment, BFWs, beam IDs, antenna configurations, and observations/measurements from the O-RUs 1005 are sent over the fronthaul (FH) to the E2 nodes (e.g., O-CUs and O-DUs), and these parameters are relayed by the E2 nodes to the training data management functionality block 4002 within the Non-RT RIC. Also shown within the "data collection and pre-processing" call-flow block 6006 are the KPIs inputs from the operator 4O1 and AI/ML training data set generation by the training data management functionality block 4002 within the Non-RT RIC.

According to one example embodiment, training data collection and control unit within the SMO framework 1006 can collect one or more of the following measurements and observations from E2 nodes (e.g., O-DU, O-CU-UP, O-CU-CP, and/or gNB) which are pre-processed to generate AI/ML model training data, which training data are used along with the set of multiple beamforming weight vectors (I/O data) and associated beam IDs to train the AI/ML model offline, inside the SMO framework 1006:

O-RU antenna configuration, which can include the number of vertical and horizontal antennas, antenna spacing, number of sectors, number of cells, physical cell identifiers;
Default set of beamforming weights and associated beam index from O-RU;
SSB RSRP reports, PRACH power, Active SSB beam index;
Successful and/or failed RACH attempts and Rx beam index;
Number of connected UEs to each gNB/TRPs in an observation;
Supported Massive MIMO system configurations;
Operators' inputs and KPIs:
   Initial access latency target,
   PRACH, PUSCH and SRS-based timing advance (TA) estimation accuracy targets,
   Target UL/DL throughput and spectral efficiency, and
   Network coverage and accessibility metrics In an example embodiment, training of the AI/ML engine can be performed offline, e.g., as shown in the functionality block 6007 in FIG. 6. Upon receiving the indication of successful training completion, SMO informs model deployment readiness to the Non-Real Time RIC functionality. As shown in the "model deployment and inference generation model" functionality block 6008, Non-Real Time RIC deploys (as shown by the process arrow 6009a) the trained AI/ML model (e.g., which can be within the Non-Real Time RIC) as rAPP via R1 interface, as well as utilizing model enrichment data (as shown by the process arrow 6009b).

Next, as shown in functionality block 6010, system initiation can involve O-RUs sending (over the M-Plane) performance reports and alarms to the training data management functionality block 4002 within the Non-RT RIC (e.g., 1007 shown in FIGS. 1-3), which performance reports and alarms are subsequently made available to the rAPP (i.e., the deployed AI/ML model).

After system initiation 6010, the deployed model uses the performance reports, measurement reports, model data and/or enrichment data available in the SMO via R1 interface to generate inferences (e.g., as shown by "AI/ML Model Inference Generation" process arrow 6011), which inferences can consist of optimal set of beamforming weight vectors and associated beam IDs. In an example embodiment, the AI/ML engine sends the new optimized set of beamforming weight vectors and associated beam IDs to the O-DU (e.g., via the O1 interface and the fronthaul (FH), or alternatively through M-plane interface). In an example embodiment, the O-DU then selects the set of beamforming weights and indexes them using the C-plane, without sending the actual beamforming weights via the fronthaul (FH) interface to the O-RU. In another example embodiment, in each slot, the O-DU sends a subset of the optimized beamforming weight vectors and the associated beam IDs to the O-RU via the C-Plane fronthaul (FH). In another example embodiment, the AI/ML-model-generated inference is per eNB/gNB/TRP and applied to the O-RU by the O-DU or the SMO depending on the nature of the operation. In another example embodiment, the training data collected by the SMO is per eNB/gNB/TRP, and AI/ML model training deployment can be per eNB/gNB/TRP or for a set of eNB/gNB/TRP.

In an example embodiment, the AI/ML engine can attach a start time parameter along with the new optimal set of SSB beam IDs and beamforming weight vectors and send them to the O-DU and O-RU via the O1 and/or the M-plane interface (s), which start time parameter specifies the time where the O-DU and O-RU are allowed to replace and use the new set of SSB beam IDs and beamforming weight vectors. The start time can be specified in different ways, e.g., as a frame number, subframe number slot index, and orthogonal frequency division multiplex (OFDM) symbol index. In an example embodiment, the start time can be expressed as absolute time. In another example embodiment, the start time can be expressed in terms of the SSB burst index.

In an example embodiment, when the O-RUs are successful in applying the new optimal set of SSB beam IDs and beamforming weight vectors, the O-RUs can send success status to the O-DU and the SMO, e.g., via the O1 and/or the M-Plane interface(s) (e.g., process arrow 6012a or 6012b). As shown in the functionality block 6013 (labeled "ML Agent Performance Monitoring"), following the successful application of new optimal set of SSB beam IDs and beamforming weight vectors, O-RUs can continue to observe and measure a set of predefined parameters and send reports to SMO and O-DU (e.g., via Fronthaul (process arrow 6014a) and/or O1 interface (process arrow 6014b)) as performance feedbacks. In an example embodiment, these observations and measurements can be used for performance evaluation and the decision to utilize a fallback configuration for the AI/ML model depending on the performance evaluation (process arrow 6015). In an example embodiment, the decision to either retain the AI/ML model or utilize a fallback configuration is made by the SMO, e.g., the system performance after the application of the new beamforming weight vectors and the associated SSB beam IDs is reported by the O-DU and compared against the target KPIs set by the operator. If the decision is made to use the fallback configuration for the AI/ML model, the default fallback SSB beam IDs and the beamforming weight vectors are transmitted by the Non-RT RIC to the O-DU over the O1 interface (process arrow 6016), and observation and/or measurement collection by the Non-RT RIC occurs over the O1 interface (process arrow 6017), followed by triggering of AI/ML engine re-training (process arrow 6018).

Example Scenario 2: AI/ML Optimization Occurring in Near-Real Time RIC

Figure 7:
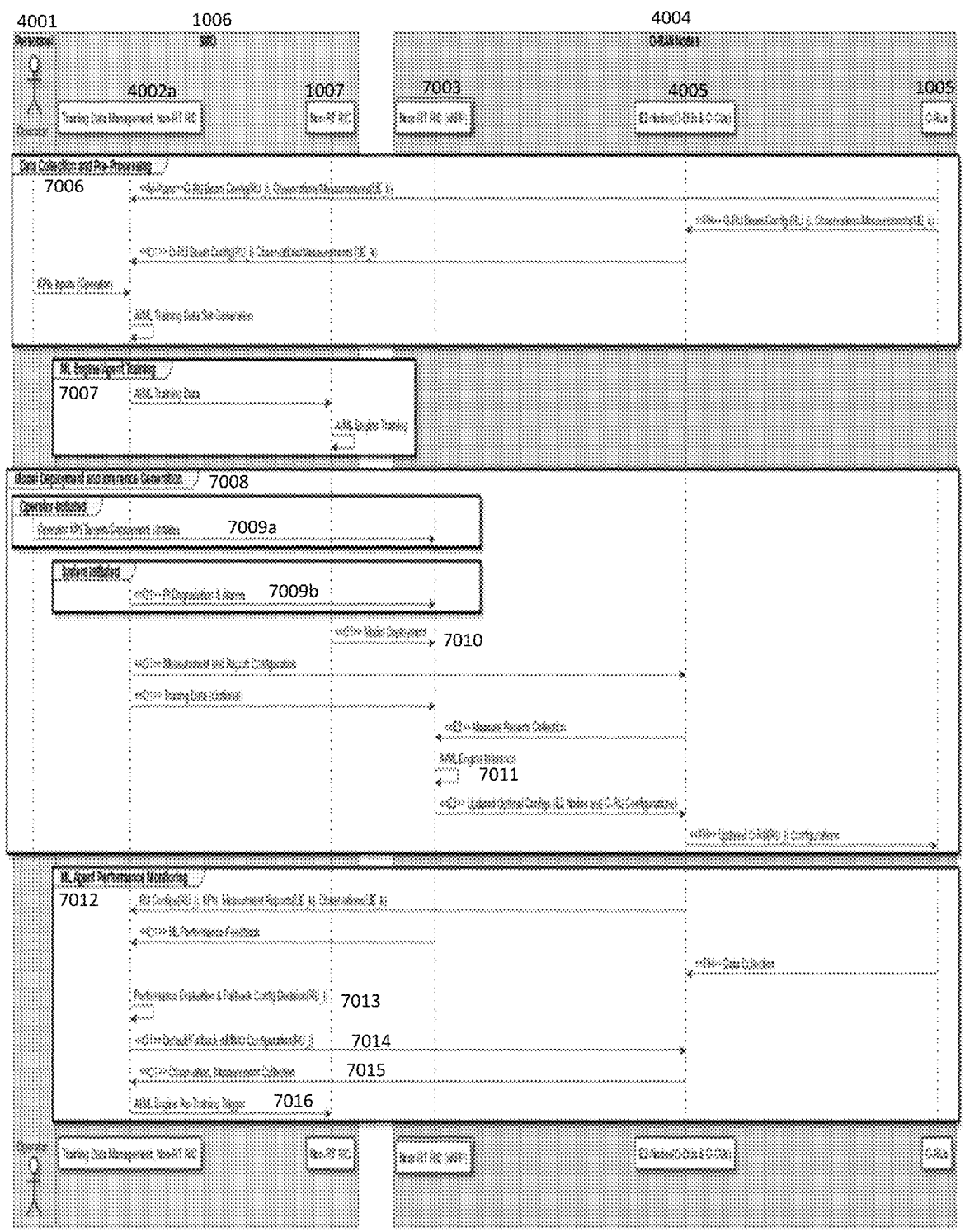
FIG. 7 illustrates a call flow diagram for near-real time RIC-based deployment of the AI/ML model.

FIG. 7 is a diagram illustrating an example embodiment of a system architecture in which training is executed in non-real time RIC and AI/ML optimization is executed in near real-time RIC. As shown in FIG. 7, the operator 4001 provides key performance indicators (KPIs) inputs and other operator inputs. The network components shown in FIG. 7 include: i) SMO framework 1006, within which training data management functionality block 4002a within Non-RT RIC 1007 is provided; and ii) Near-RT RIC 7003 (e.g., as an xAPP), O-RAN nodes 4004, which include E2 nodes 4005 (e.g., O-CUs and O-DUs) and O-RUs 1005. In one example embodiment shown in FIG. 7, the training data management functionality block 4002 within the Non-RT RIC obtains (as shown within the "data collection and pre-processing" call-flow block 7006) O-RU beam configurations and observations/measurements from the O-RUs 1005 over the M-Plane. In an alternative embodiment, O-RU beam configurations and observations/measurements from the O-RUs 1005 are sent over the fronthaul (FH) to the E2 nodes (e.g., O-CUs and O-DUs), and these parameters are relayed by the E2 nodes to the training data management functionality block 4002 within the Non-RT RIC. Also shown within the "data collection and pre-processing" call-flow block 7006 are the KPIs inputs from the operator 4O1 and AI/ML training data set generation by the training data management functionality block 4002 within the Non-RT RIC.

According to one example embodiment, training data collection and control unit within the SMO framework 1006 can collect one or more of the following measurements and observations from E2 nodes (e.g., O-DU, O-CU-UP, O-CU-CP, and/or gNB) which are pre-processed to generate AI/ML model training data, which training data are used along with the set of multiple beamforming weight vectors (I/O data) and associated beam IDs to train the AI/ML model offline, inside the SMO framework 1006 (i.e., in Non-Real Time RIC):

O-RU Beam Configuration information, which can include at least one of the following from the O-RU depending on the scenario chosen:
i) Antenna configuration (Number of vertical and horizontal antennas, antenna spacing, number of sectors, number of cells, physical cell identifiers, or
ii) a set of beam book (associated beam book IDs and BFWs), or
iii) a set of beam IDs and associated BFWs;
Default set of beamforming weights, associated beam index from O-RU;
SSB RSRP reports, PRACH power, Active SSB beam index;
Successful and/or failed RACH attempts and Rx beam index;
Number of connected UEs to each gNB/TRPs in an observation;
Supported Massive MIMO system configurations; and
Operators' inputs and KPIs, which can include:

Initial access latency target,
PRACH, PUSCH and SRS based TA estimation accuracy targets,
Target UL/DL throughput and spectral efficiency, and/or
Network coverage and accessibility metrics.

In an example embodiment, training of the AI/ML engine can be performed offline, e.g., as shown in the functionality block 7007 in FIG. 7. Upon receiving the indication of successful training completion, SMO informs model deployment readiness to the Near-RT RIC 1007. As shown in the "model deployment and inference generation model" functionality block 7008, operator 4001 sends KPI targets and/or AI/ML model deployment updates (as shown by process arrow 7009a) to the Near-RT RIC 7003. Once the system is initiated, the training data management functionality block 4002 within the Non-RT RIC 1007 sends PI degradation information and alarms (as shown by the process arrow 7009b) to the Near-RT RIC 7003. Non-Real Time RIC 1007 deploys the trained AI/ML model to Near-Real Time RIC 7003 over O1 interface (as shown by the process arrow 7010).

Next, the training data management functionality block 4002 within the Non-RT RIC can send i) measurement and report configuration to the E2 nodes over O1 interface, and/or ii) training data to the Near-RT RIC 7003 over the O1 interface. The E2 nodes send measurement reports to the Near-RT RIC 7003 over the E2 interface. In an example embodiment, the deployed model uses observations, performance and/or measurement reports, and/or enrichment data available in the Near-Real Time RIC to generate inferences (e.g., as shown by "AI/ML Engine Inference" process arrow 7011), which inferences can consist of optimal set of i) beamforming weight vectors and associated beam IDs, or ii) beam book IDs and associated BFWs, or iii) beam IDs and associated BFWs.

In an example embodiment, the AI/ML engine sends the new optimized set of i) beamforming weight vectors and associated beam IDs, or ii) beam book IDs and associated BFWs, or iii) beam IDs and associated BFWs to the O-DU via the O1 interface and to the O-RU via the M-plane interface. In an example embodiment, the O-DU then selects the set of beamforming weights IDs, beam book IDs, or beam IDs and indexes them using the C-plane, without sending the actual beamforming weights via the fronthaul (FH) interface to the O-RU. In another example embodiment, in each slot, the O-DU sends a subset of the optimized beamforming weights and the associated beam IDs to the O-RU via the C-Plane fronthaul (FH). In another example embodiment, the AI/ML-model-generated inference is per eNB/gNB/TRP and applied to the O-RU by the O-DU or the SMO depending on the nature of the operation. In another example embodiment, the training data collected by the SMO is per eNB/gNB/TRP, and AI/ML model training deployment can be per eNB/gNB/TRP or for a set of eNB/gNB/TRP.

In an example embodiment, the AI/ML engine can attach a start time parameter along with the new optimal set of SSB beam IDs and beamforming weights and send them to the O-DU and O-RU via the O1 and/or the M-plane interface(s), which start time parameter specifies the time where the O-DU and O-RU are allowed to replace and use the new set of SSB beam IDs and beamforming weights. The start time can be specified in different ways, e.g., as a frame number, subframe number slot index, and orthogonal frequency division multiplex (OFDM) symbol index. In an example embodiment, the start time can be expressed as absolute time. In another example embodiment, the start time can be expressed in terms of the SSB burst index.

In an example embodiment, when the O-RUs are successful in applying the new optimal set of SSB beam IDs and beamforming weight vectors, the O-RUs can send success status to the O-DU and the SMO, e.g., via the O1 and/or the M-Plane interface(s). As shown in the functionality block 7012 (labeled "ML Agent Performance Monitoring"), following the successful application of new optimal set of SSB beam IDs and beamforming weights, 1) O-RUs can continue to observe and measure a set of predefined parameters and send reports to the E2 nodes, 2) the E2 nodes can send RU configuration, KPIs, measurement reports and observations to the training data management functionality block 4002a, and 3) the Near-RT RIC 7003 can send AI/ML performance feedback to the training data management functionality block 4002a. In an example embodiment, these observations and measurements can be used for performance evaluation and the decision to utilize a fallback configuration for the AI/ML model depending on the performance evaluation (process arrow 7013). In an example embodiment, the decision to either retain the AI/ML model or utilize a fallback configuration is made by the SMO, e.g., the system performance after the application of new O-RU beam configuration and the associated indexing by O-DU is reported by O-DU and compared against the target KPIs set by the operator. If the decision is made to use the fallback configuration for the AI/ML model, the default fallback configuration is transmitted to the O-DU over the O1 interface (process arrow 7014), and observation and/or measurement collection occurs over the O1 interface (process arrow 7015), followed by triggering of AI/ML engine re-training (process arrow 7016).

ABBREVIATIONS

3GPP: 3rd Generation Partnership Project
5GC: 5G Core
AI: Artificial Intelligence
CM: Configuration Management
eNB: evolved Node B
FFT: Fast Fourier Transform
gNB: next generation Node B
gNB-CU: gNB Central Unit
gNB-DU: gNB Distributed Unit
iFFT: inverse Fast Fourier Transform
LTE: Long Term Evolution
MAC: Media Access Control
ML: Machine Learning
Near-RT RIC: Near-Real-Time RAN Intelligent Controller
NG-RAN: Next Generation RAN
NMS: Network Management System
Non-RT RIC: Non-Real-Time RAN Intelligent Controller
NR: 5G New Radio
O-Cloud: O-RAN Cloud
O-CU-CP: O-RAN Central Unit-Control Plane.
O-CU-UP: O-RAN Central Unit-User Plane
O-DU: O-RAN Distributed Unit
O-eNB: O-RAN eNB
O-RAN: Open RAN
O-RU: O-RAN Radio Unit
PDCP: Packet Data Convergence Protocol
PHY: Physical layer
PM: Performance Management
PNF: Physical Network Function
PRACH: Physical Random Access Channel
RAN: Radio Access Network
rApp: Non-RT RIC Application
RAT: Radio Access Technology
RF: Radio Frequency
RLC: Radio Link Control
RRC: Radio Resource Control
RRM: Radio Resource Management
RRU: Remote Radio Unit
RU: Radio Unit
SDAP: Service Data Adaptation Protocol
SMO: Service Management and Orchestration
TRP: Transmission-and-Reception Point
VNF: Virtualized Network Function
xApp: Near-RT RIC Application
xNF: Any Network Function

The invention claimed is:

1. A method of optimizing synchronization signal block (SSB) beam configuration for $3^{rd}$ Generation Partnership Project (3GPP) New Radio (NR) network, the method comprising:
   using at least one of an artificial intelligence (AI) and machine learning (ML) engine in a near-real time radio access network intelligent controller (Near-RT RIC) to derive at least one optimal SSB beam configuration for the 3GPP NR network; and
   communicating, by the at least one of the AI and ML engine, the derived at least one optimal SSB beam configuration to a network node of the 3GPP NR network;
   wherein the derived at least one optimal SSB beam configuration is per one of eNB, gNB or transmission-and-reception point (TRP); and
   wherein the at least one of the AI and ML engine generates an optimized set of beamforming weight vectors and associated beam identifiers (IDs) as part of the at least one optimal SSB beam configuration, based on selected parameters received from at least one of service management and orchestration (SMO) module, an Open Radio Access Network Distributed Unit (O-DU), and an Open Radio Access Network Radio Unit (O-RU), and wherein said selected parameters include at least one of i) number of vertical and horizontal antennas, and ii) antenna spacing.

2. The method of claim 1, further comprising:
   sending, by the O-DU in each slot, a subset of the optimized set of beamforming weight vectors and associated beam IDs to the O-RU.

* * * * *